United States Patent [19]

Bravo

[11] Patent Number: 4,964,333
[45] Date of Patent: Oct. 23, 1990

[54] ELLIPSOIDAL PASTEURIZER FOR FOOD MIXTURES

[75] Inventor: Francesco Bravo, Montecchio Maggiore, Italy

[73] Assignee: Bravo, S.p.A., Vicenze, Italy

[21] Appl. No.: 255,321

[22] Filed: Oct. 11, 1988

[30] Foreign Application Priority Data

Oct. 28, 1987 [IT] Italy ............................ 22435 A/87

[51] Int. Cl.⁵ .............................................. A23G 9/00
[52] U.S. Cl. ....................................... 99/455; 62/342; 99/348; 99/453; 99/470; 99/483; 165/109.1; 366/146; 366/149; 366/316; 366/317
[58] Field of Search ........ 366/144, 146, 149, 315–317; 99/348, 455, 483, 453, 470; 62/342; 165/109.1, 120; 416/181, 227 R

[56] References Cited

U.S. PATENT DOCUMENTS

| | | | |
|---|---|---|---|
| 2,436,585 | 2/1948 | Mangold | 366/315 |
| 2,607,566 | 8/1952 | Saunders | 366/315 |
| 2,740,558 | 4/1956 | Steele | 366/315 |
| 2,764,880 | 10/1956 | Wenzelberger | 62/342 |
| 3,369,596 | 2/1968 | Maeland | 165/109.1 |
| 3,606,577 | 9/1971 | Conn | 416/227 |
| 3,618,587 | 11/1971 | Lee, Sr. | 99/348 |
| 3,638,917 | 2/1972 | Osten | 366/149 |
| 4,542,268 | 9/1985 | Jarvis et al. | 219/10.55 B |
| 4,681,458 | 7/1987 | Cavalli | 366/149 |
| 4,813,787 | 3/1989 | Conn | 366/316 |

FOREIGN PATENT DOCUMENTS

| | | | |
|---|---|---|---|
| 259793 | 12/1948 | Fed. Rep. of Germany | 366/316 |
| 1442687 | 8/1963 | Fed. Rep. of Germany | 366/316 |

*Primary Examiner*—Timothy F. Simone
*Attorney, Agent, or Firm*—Shlesinger, Fitzsimmons, Shlesinger

[57] ABSTRACT

A pasteurizer for foodstuff mixtures comprises a tank with which are associated heating, cooling and mixture circulation means. The tank (11) is ellipsoidal in shape with a bodyshell (12) and a base (13), and the said mixture circulation means comprise an auger-type device (15) mounted adjacent to the base (13), which is in the form of a disc (16) and is slightly drawn so as to have a tapered circumferential edge (17). From the upper side of the disc (16) there extend tabs (18) which form respective mixture aspiration ports (19), while below the ports (19) there extend respective centrifugal blades (20), which move the aspirated mixture through the ports (19).

5 Claims, 5 Drawing Sheets

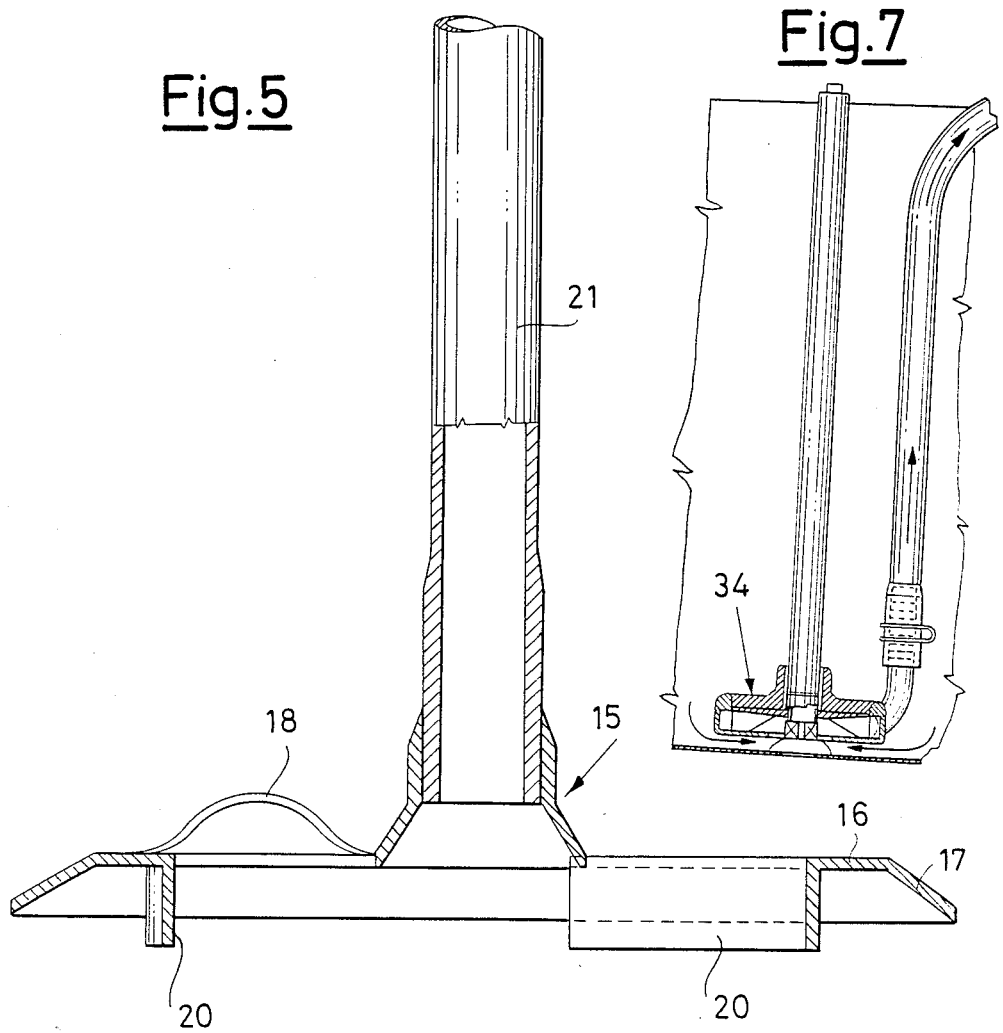

ELLIPSOIDAL PASTEURIZER FOR FOOD MIXTURES

The present invention relates to an elliposidal pasteurizer for foodstuff mixtures, in particularly mixtures for the production of icecream.

Persons with ordinary skill in the art are aware of the requirements that a food pasteurizer should satisfy: it should within a reasonably brief period of time bring the entire mixture to a uniform pasteurization temperature—which if high, i.e. in the region of 85° C.—is maintained for a few second and—if less high, i.e. in the region of 65° C.—is maintained for about 30 minutes.

The heating has to be followed by an as rapid as possible cooling to the storage temeprature, generally about 4° C. The cooling must be very rapid in order quickly to cover the spore reproduction range, which is between 45° C. and 25° C. It is thus evident that, to meet the aforesaid requirements, the shape of a pasteurizer must be such as to ensure a uniform and continuous circulation of the mixture within it, and must be equipped with adeguate heating, cooling and mixture circulation means.

The problems connected with pasteurizing a food mixture, especially one for icecream production, are for example considered in Italian patent No. 970.644 and industrial model 175.557.

The overall object of the present invention is to empody a pasteurizer that will solve the said problems and that has a very straightforward and compact structure and is thus economical to manifacture.

To attain the said object, the present invention embodies a pasteurizer for food mixtures of the type comprising a tank with which there are associated heating, cooling and mixture circulation means, wherein the tank (11) has an ellipsoidal shape with a bodyshell (12) and a base (13) and the said mixture circulation means comprise an auger-type device (15) mounted adjacent to the base (13) and is in the form of a disc (16) which is slightly drawn so as to have a tapered or slenderized circumferential edge (17), there extending upwards from the disc (16) deflector tabs (18) which form respective mixture aspiration ports (19), while below the ports (19) there extend respective centrifugal blades (20) which move the aspirated mixture through the ports (19).

The structural and funtional characteristics of the invention, and its advantages over the know art, will become more apparent from an examination of the following description referred to the appended diagrammatic drawings, which show an example of a pasteurizer in accordance with the innovative principles of the invention. In the drawings:

FIG. 5 is a section taken on the line V—V of FIG. 4;

FIG. 6 is a section taken on the line VI—VI of FIG. 4;

FIG. 7 is an illustration of a particular.

Figure 1:
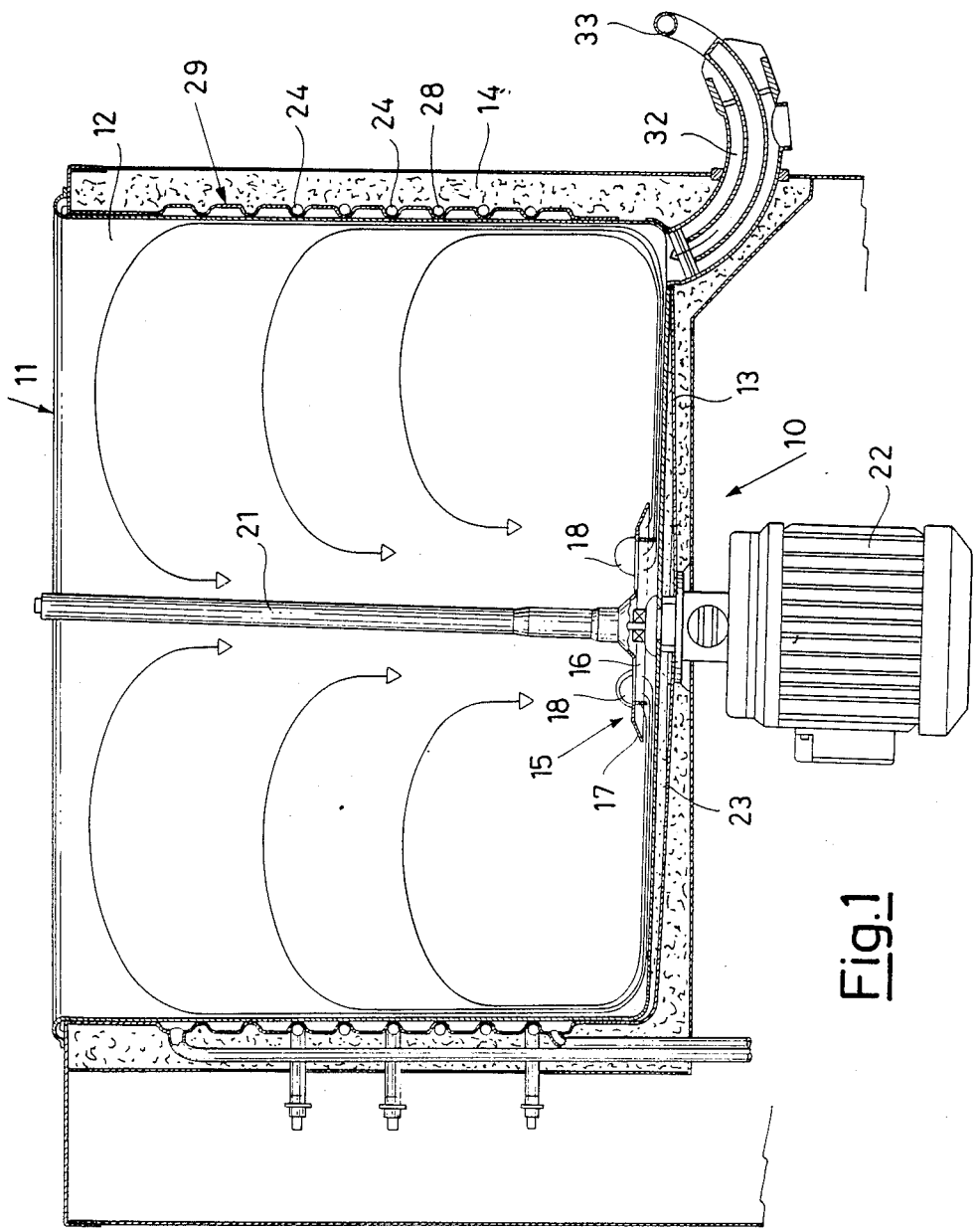
FIG. 1 is a vertical section illustrating the pasteurizer of the invention.
Figure 2:
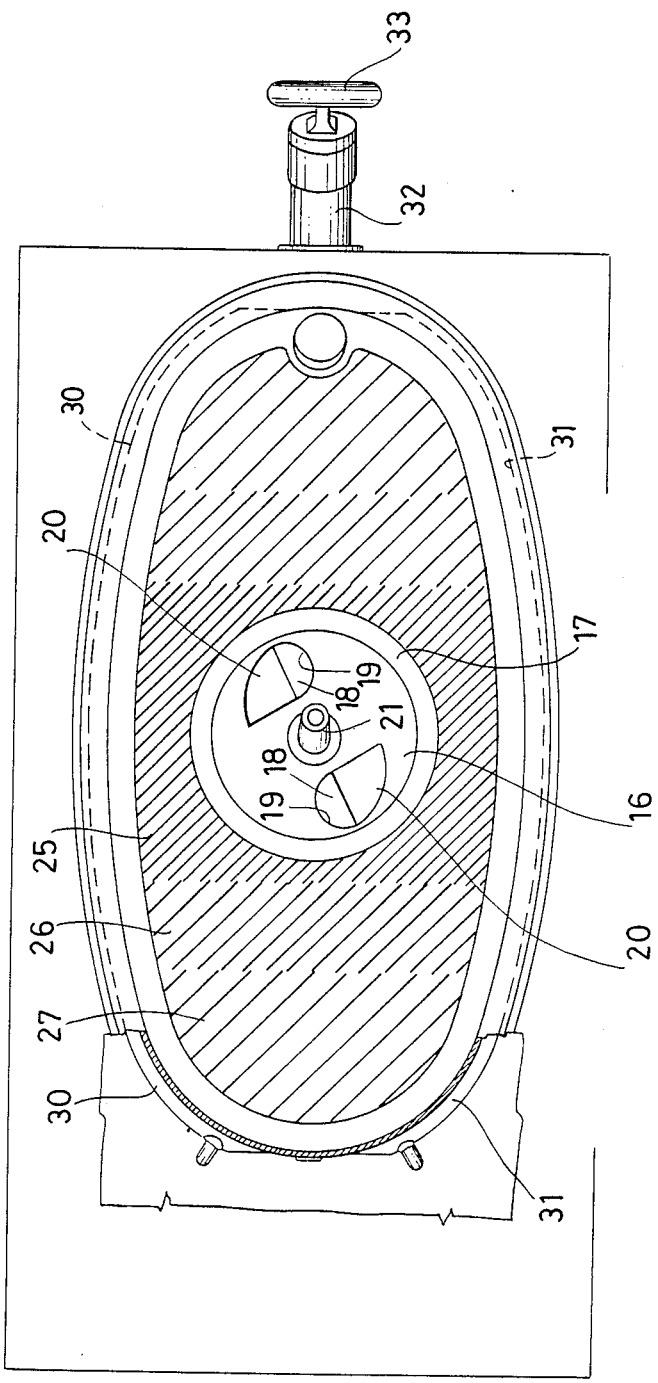
FIG. 2 is a partially cutaway and sectioned plan view of the pasteurizer of FIG. 1.
Figure 3:
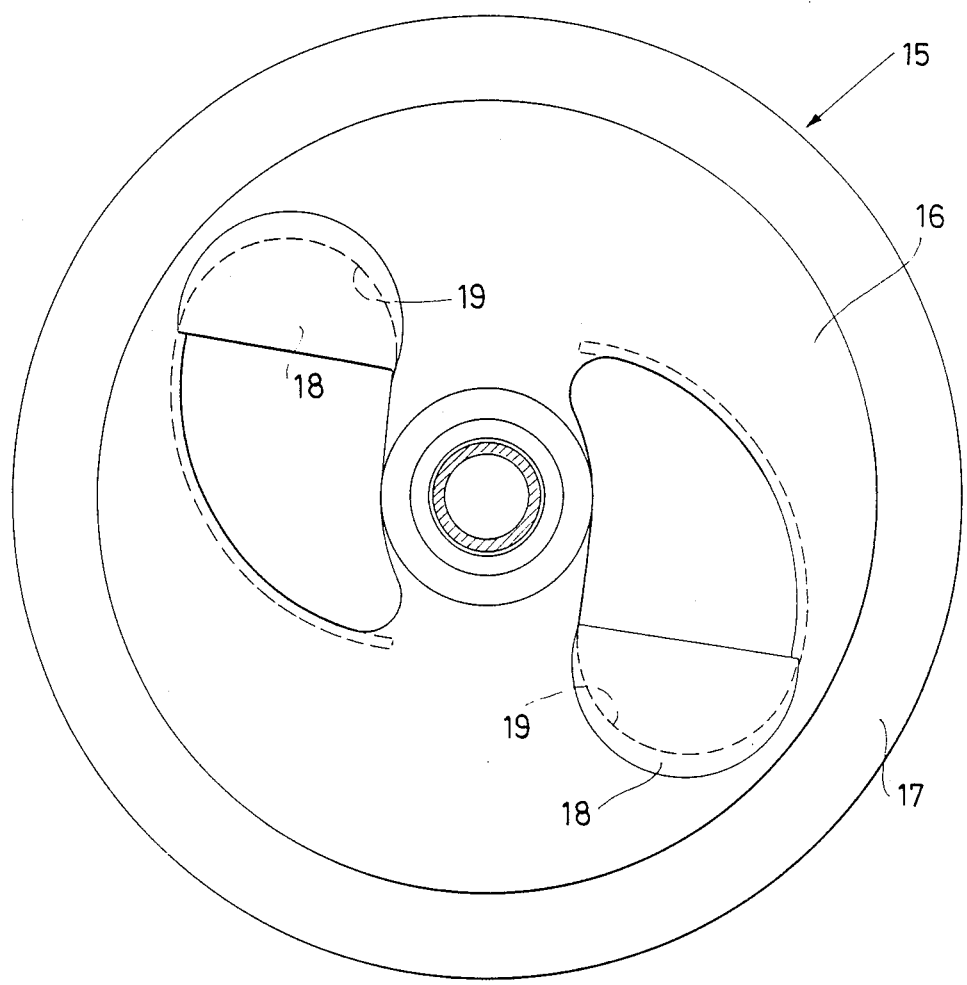
FIG. 3 is a top plan view of the device 15.
Figure 4:
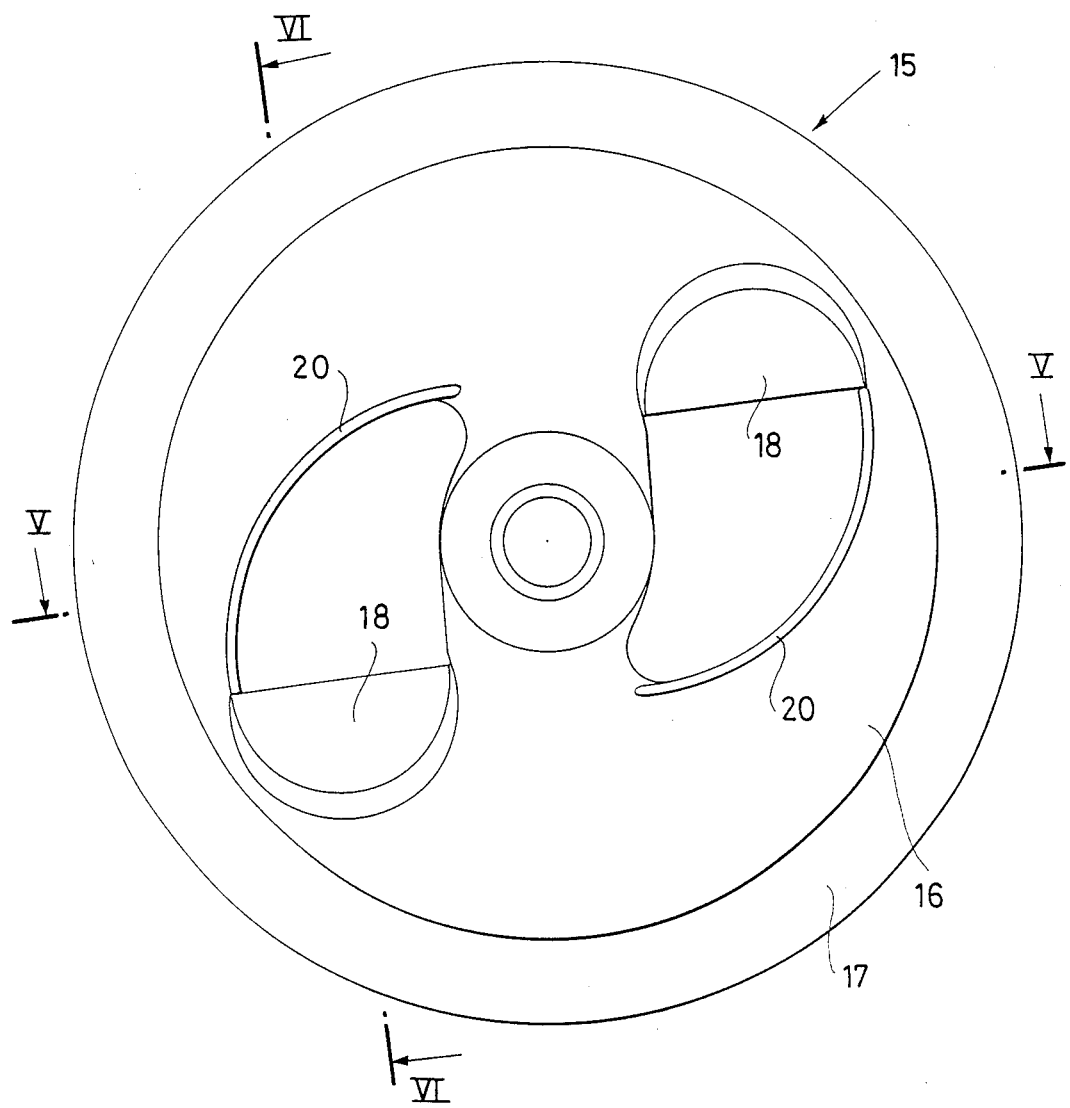
FIG. 4 is a bottom plan view of the device 15.

With reference to the drawings, the pasteurizer in question is indicated overall by 10 and consists structurally of a tank 11 which in plan view has a characteristic ellipsoidal shape.

The bodyshell 12 and the base 13 of the tank are provided with appropriate insulation 14.

The mixture circulates correctly and uniformly inside the tank 11, with no stagnation, as a direct result of the ellipsoidal shape of the tank 11 and by the agency of a characteristic auger-type stirrer or rotatable blending device 15 mounted adjacent to the base 13.

The device 15 (FIGS. 3 to 6) consists structurally of a disc 16 slightly drawn so as to have a tapered or slenderized circumferential edge 17. From the disc 16, by shearing and draing, there are formed upwardly a pair of dome-shaped deflector tabs 18, which form respective mixture aspiration ports 19, while there are formed below a pair of centrifugal blades or paddles 20 which move the aspirated mixture through the ports 19.

As a result of the presence of the tapered or slenderized edge 17, the mixture is first sent, with a centrifugal laminar movement, to lap the entire base of the tank 11, and then rises along the interior of the bodyshell 12, as shown in FIG. 1 by the arrows. For the purposes of rotation, the blending device 15 is fixed to a tubalar shaft 21 mounted and coupled in a freely removable manner onto the output shaft of an electric motor 22 disposed below the tank 11.

In the example shown, the ports 19 and the blades 20 are disposed in diametrically opposite pairs, but their number and disposition can be varied according to needs.

The mixture is heated rapidly and uniformly by means of foil-type resistances 23 applied externally to the base 13 and, optionally, by wire-wound heater coils or resistances 24 applied externally to the bodyshell 12.

The resistances 23 have electric intensities and consequent heat emission that decreases according as the distance from the blending device 15 increases, as indicated in FIG. 1 by the hatched areas 25, 26 and 27. In the area 25, proximal to the device 15, the electric intensity of the resistances 23 is maximal, inasmuch as the mixture circulation rate is greatest in such area. The electric intensity is of middling degree in the area 26, and lower in the peripheral area 27 where mixture circulation rate is less. The turns of any wire-wound resistances 24 are on the other hand inserted into respective annular grooves 28 in an evaporated shell 29 of the cooling circuit; in this way, the heat exchange surface between the resistances 24 and the bodyshell is augmented.

A further characteristic of the evaporation shell 29 is that it consists of two half-shells 30, 31, which are welded together and force-fitted to the bodyshell 12 of the tank so as to conform to its shape perfectly and thus promote heat exchange; to this end, both the bodyshell 12 and the half-shells 30, 31 are slightly conical in shape from top to bottom as shown in FIG. 1). The evaporator and the tank are welded together only in the region of the upper and lower edges of the evaporator, this resulting in a large heat exchange surface area which promotes a rapid and uniform cooling of the mixture, and at the same time prevents ice from forming on the bodyshell 12.

The pasteurized mixture can be taken off either through a conduit 32 extending from the base of the tank 11, which base features a tap 33, or by means of a trasfer and metering pump 34 which is removably mounted in place of the device 15 (FIG. 7). The pump 34 transfers the boiling mixture from the pasteurizer to another container vessel; alternatively, by using a timed system, constant doses of mixture can be sent repeatedly to the close-lying whisking device. As the pump is located in the controlled temperature tank, the problem of the heating-up of the transfer line, with consequent increase of the microbial count within it, is in part obviated.

I claim:

1. Pasteurizer for food mixtures of the type comprising a tank having thereon heating means and cooling means and containing mixture circulation means, and wherein the said tank (11) has an ellipsoidal shape and comprises an ellipsodally shaped bodyshell (12) for holding a food mixture that is to be pasteurized, said bodyshell having a base (13) secured to and closing the bottom thereof, and said mixture circulation means comprises a rotatable impeller device (15) mounted in said bodyshell adjacent to said base (13) and being in the form of a rotatable disc (16) which is slightly drawn so as to have thereon a tapered circumferential edge (17), said disc having formed upwardly therefrom a plurality of deflector tabs (18) which form corresponding aspiration ports (19) in said disc, and said disc having formed thereon below said ports centrifugal blades (20) for moving an aspirated food mixture in said tank through the ports (19), when said disc is rotated.

2. Pasteurizer as described in claim 1, wherein said heating means comprises foil-type resistances (23) applied externally to the base (13); said resistances (23) having electric intensities that decrease according to the increase in the responsive distances of said resistances from the impeller device (15).

3. Pasteurizer as described in claim 2, wherein said heating means also comprises wire-wound resistance (24) mounted in respective annular grooves (28) formed in an evaporator (29) shell, said evaporator shell forming part of said cooling means and being applied externally to said bodyshell (12).

4. Pasteurizer as described in claim 3, wherein said evaporator shell (29) comprises two half-shells (30, 31) which are welded together and force-fitted onto the outside of said bodyshell (12) of the tank (11) so as to conform exactly to its shape.

5. Pasteurizer as described in claim 1, wherein said impeller device is removably mounted in said tank to be interchangeable with a transfer and metering pump (34) operable to pump an aspirated food mixture out of said tank.

* * * * *